(12) United States Patent
Gerweck et al.

(10) Patent No.: US 11,537,610 B2
(45) Date of Patent: Dec. 27, 2022

(54) DATA STATEMENT CHUNKING

(71) Applicant: AtScale, Inc., San Mateo, CA (US)

(72) Inventors: Sarah Gerweck, Santa Clara, CA (US); David P. Ross, San Francisco, CA (US); Daren Drummond, Redwood City, CA (US)

(73) Assignee: AtScale, Inc., San Mateo, CA (US)

( * ) Notice: Subject to any disclaimer, the term of this patent is extended or adjusted under 35 U.S.C. 154(b) by 623 days.

(21) Appl. No.: 15/836,836

(22) Filed: Dec. 9, 2017

(65) Prior Publication Data

US 2019/0179942 A1 Jun. 13, 2019

(51) Int. Cl.
*G06F 16/2453* (2019.01)
*G06F 16/2455* (2019.01)

(52) U.S. Cl.
CPC .... *G06F 16/24537* (2019.01); *G06F 16/2455* (2019.01); *G06F 16/24532* (2019.01); *G06F 16/24545* (2019.01)

(58) Field of Classification Search
CPC .......... G06F 16/24537; G06F 16/2455; G06F 16/24545; G06F 16/24532
See application file for complete search history.

(56) References Cited

U.S. PATENT DOCUMENTS

| | | | |
|---|---|---|---|
| 6,236,997 B1 | 5/2001 | Bodamer et al. | |
| 6,308,178 B1 | 10/2001 | Chang et al. | |
| 7,275,029 B1* | 9/2007 | Gao | G06F 40/44 704/10 |
| 7,668,878 B2 | 2/2010 | Arora et al. | |
| 7,689,582 B2 | 3/2010 | Behnen et al. | |
| 8,041,670 B2 | 10/2011 | Bakalash | |
| 9,372,889 B1* | 6/2016 | Jakobsson | G06F 16/24534 |
| 9,639,616 B2* | 5/2017 | Palmert | G06F 16/9535 |
| 2002/0038348 A1 | 3/2002 | Malone | |
| 2006/0149703 A1* | 7/2006 | Poyourow | G06F 16/24553 |

(Continued)

OTHER PUBLICATIONS https://451research.com/report-short?entityId=92407, 451 Research Impact Report, "Kyvos adds SQL support, availability on Google Cloud for OLAP-on-Hadoop" May 8, 2017, 1 page.

(Continued)

*Primary Examiner* — Belix M Ortiz Ditren
*Assistant Examiner* — Yohanes D Kelemework
(74) *Attorney, Agent, or Firm* — Armis IP Law, LLC

(57) ABSTRACT

Techniques are presented for applying fine-grained client-specific rules to divide (e.g., chunk) data statements to achieve cost reduction and/or failure rate reduction associated with executing the data statements over a subject dataset. Data statements for the subject dataset are received from a client. Statement attributes derived from the data statements are processed with respect to fine-grained rules and/or other client-specific data to determine whether a data statement chunking scheme is to be applied to the data statements. If a data statement chunking scheme is to be applied, further analysis is performed to select a data statement chunking scheme. A set of data operations are generated based at least in part on the selected data statement chunking scheme. The data operations are issued for execution over the subject dataset. The results from the data operations are consolidated in accordance with the selected data statement chunking scheme and returned to the client.

20 Claims, 10 Drawing Sheets

(56) References Cited

U.S. PATENT DOCUMENTS

| | | |
|---|---|---|
| 2007/0028108 A1 | 2/2007 | Cowburn |
| 2007/0113076 A1 | 5/2007 | Cowburn |
| 2007/0143311 A1* | 6/2007 | Uppala ............... G06F 16/2471 |
| 2008/0133561 A1* | 6/2008 | Dubnicki ................ H04L 69/04 |
| 2010/0125565 A1 | 5/2010 | Burger |
| 2011/0047110 A1* | 2/2011 | Rinkus ..................... G06N 3/02 706/18 |
| 2011/0208495 A1* | 8/2011 | Yuta ........................ G06F 17/18 703/2 |
| 2013/0041872 A1* | 2/2013 | Aizman ................ G06F 16/182 707/690 |
| 2014/0136571 A1* | 5/2014 | Bonvin ............... G06F 16/2219 707/792 |
| 2014/0337315 A1* | 11/2014 | Slezak .............. G06F 16/24542 707/718 |
| 2015/0193500 A1* | 7/2015 | Aute ................. G06F 16/24537 707/718 |
| 2015/0379430 A1* | 12/2015 | Dirac ..................... G06N 20/00 706/12 |
| 2016/0092544 A1* | 3/2016 | Shivarudraiah ....... G06F 16/278 707/600 |
| 2016/0098037 A1 | 4/2016 | Zornio |
| 2016/0098448 A1 | 4/2016 | McShane |
| 2016/0314173 A1 | 10/2016 | Lydick |
| 2017/0091470 A1 | 3/2017 | Infante-Lopez |
| 2017/0103105 A1 | 4/2017 | Barsness |
| 2017/0139982 A1* | 5/2017 | Weyerhaeuser .... G06F 16/2425 |
| 2017/0235786 A9 | 8/2017 | Faith |
| 2017/0293626 A1* | 10/2017 | Dageville ............. G06F 16/156 |
| 2017/0316007 A1* | 11/2017 | Vandenberg ........... G06N 3/006 |

OTHER PUBLICATIONS https://www.slideshare.net/AtulSharma225/kyvos-insights-datasheet-60646546 "Kyvos insights", Apr. 8, 2016, 2 pages.

International Preliminary Report & Written Opinion of PCT Application No. PCT/US2015/022082, dated Jun. 25, 2015, 3 pages total.

International Search Report & Written Opinion of PCT Application No. PCT/US2016/031684, dated Oct. 19, 2016, 6 pages total.

https://www.ibm.com/support/knowledgecenter/en/ssw_i5_54/rzajq/rzajqdispatcher.htm, "Query Dispatcher", downloaded May 2, 2017, 1 page.

Data Structures for Databases, Jan. 1, 2001, Hammer, Joachim, 24 pages.

Oauth_2_Framework_rfc6749, Oct. 2012, Hardt, Ed., 76 pages.

* cited by examiner

DATA STATEMENT CHUNKING

FIELD

This disclosure relates to data analytics, and more particularly to techniques for data statement chunking.

BACKGROUND

The increasing volume, velocity, and variety of information assets (e.g., data) drive the design and implementation of modern data storage environments. While all three components of data management are growing, the volume of data often has the most direct impact on costs incurred by a data management client (e.g., user, enterprise, process, etc.). As an example, a data analyst from a particular enterprise that is issuing data statements (e.g., queries) on a large dataset from a business intelligence (BI) application will incur costs related to the processing (e.g., CPU) resources consumed to execute the data operations invoked by such data statements. Specifically, executing an SQL aggregation query with high cardinality (e.g., due to the number of dimensions in the GROUP BY clause, etc.) over a large dataset (e.g., millions of rows) can incur significant processing costs.

With today's distributed and/or cloud-based storage environments, direct expenditures associated with using various computing networks and/or accessing certain storage facilities (e.g., egress costs, etc.) can also be incurred. The "cost" of human resources consumed while a user waits for a query to execute over a large dataset can also be significant. In some cases, the probability that a query might fail increases commensurately with the size of the dataset. If a query fails, then the foregoing costs have been incurred in vain since no query results are produced.

Unfortunately, legacy techniques for managing the foregoing cost and/or failure characteristics of data operations over large datasets have limitations. One legacy approach relies on a query engine associated with the subject dataset to execute the data operations in a manner that achieves certain objectives. The objectives considered by such query engines, however, are deficient in addressing the aforementioned cost and/or failure challenges associated with data operations over large datasets. For example, query engines might execute data operations in accordance with broad-based rules pertaining to resource loading and/or resource balancing rather than in consideration of incurred resource costs.

In addition to the limited rules available to the query engine, the corpus of information available at the query engine to apply to data operation execution decisions is also limited. Specifically, the query engine does not have access to certain data (e.g., statistical data, behavioral data, etc.) associated with the client (e.g., user, enterprise, process, etc.) that is required to address the data operation cost and/or failure challenges that are specific to the client. What is needed is a technological solution that reduces the client-specific costs and/or failure rates associated with performing data operations over large datasets.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by their occurrence in this section.

SUMMARY

The present disclosure describes techniques used in systems, methods, and in computer program products for data statement chunking, which techniques advance the relevant technologies to address technological issues with legacy approaches. More specifically, the present disclosure describes techniques used in systems, methods, and in computer program products for rule-based chunking of data statements for operation over large datasets in data storage environments. Certain embodiments are directed to technological solutions for evaluating client-specific rules and/or data to chunk data statements into data operations that facilitate cost reduction and/or failure rate reduction associated with executing the data statements over large datasets in a data storage environment.

The disclosed embodiments modify and improve over legacy approaches. In particular, the herein-disclosed techniques provide technical solutions that address the technical problems attendant to reducing the client-specific costs and/or failure rates associated with data operations that are performed over large datasets. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of database systems as well as advances in various technical fields related to processing heterogeneously structured data.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
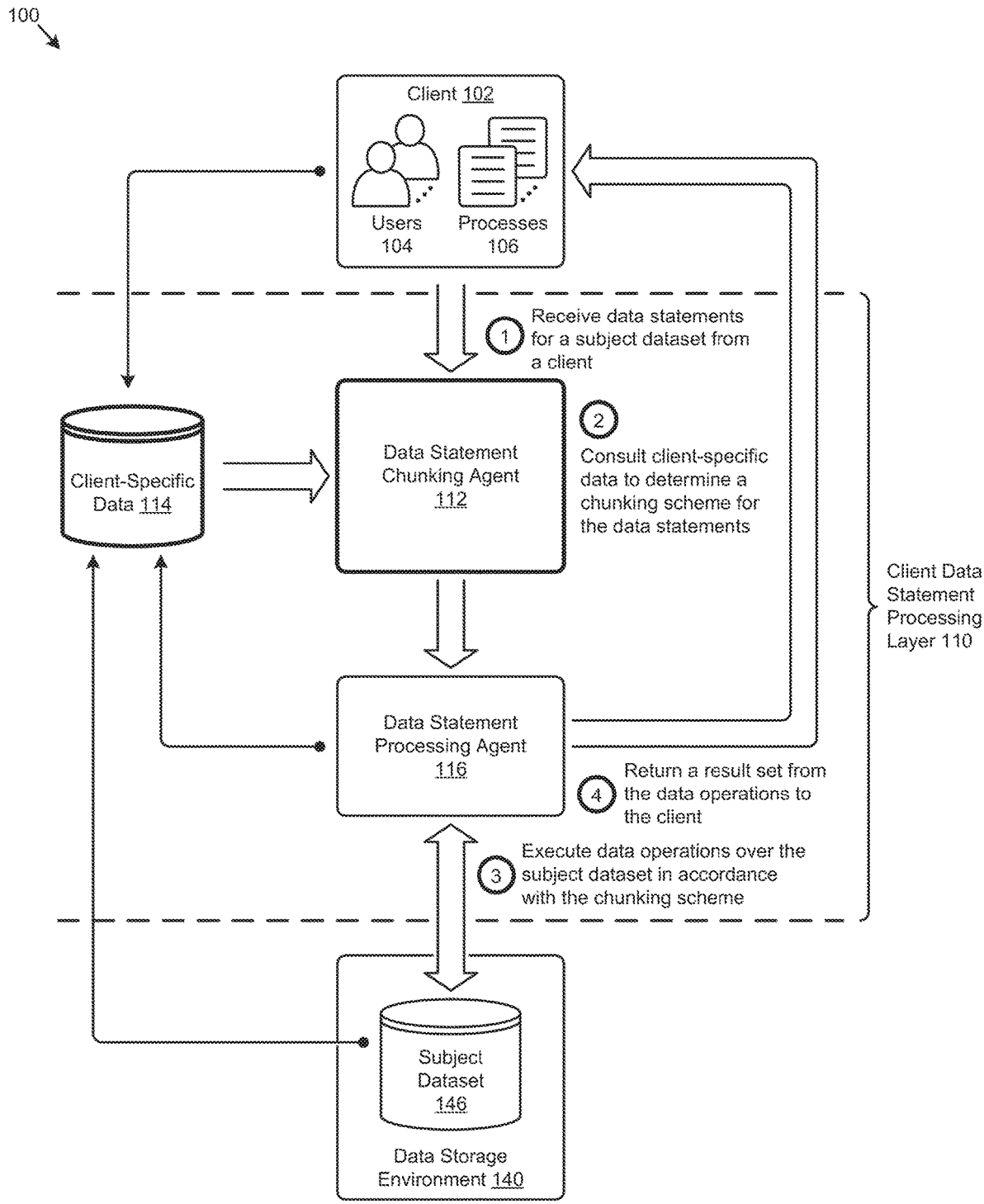
FIG. 1 presents a diagram that depicts several implementation techniques pertaining to rule-based chunking of data statements for operation over large datasets in data storage environments, according to some embodiments.

Embodiments in accordance with the present disclosure address the problem of reducing the client-specific costs and/or failure rates associated with data operations that are performed over large datasets. Some embodiments are directed to approaches for evaluating client-specific rules and/or data to chunk data statements into data operations that facilitate cost reduction and/or failure rate reduction associated with executing the data statements over large datasets in a data storage environment. The accompanying figures and discussions herein present example environments, systems, methods, and computer program products for rule-based chunking of data statements for operation over large datasets in data storage environments.

OVERVIEW

Disclosed herein are techniques that apply fine-grained client-specific rules to divide (e.g., chunk) data statements so as to achieve cost reduction and/or failure rate reduction associated with executing the data statements over a subject dataset in a data storage environment. In certain embodiments, the data statements for a subject dataset are received from a client (e.g., a user, a process, an enterprise, etc.). The data statements are analyzed to derive a set of statement attributes associated with the data statements. The statement attributes are exposed to the fine-grained rules and/or other client-specific data to determine whether a data statement chunking scheme is to be applied to the data statements. If a data statement chunking scheme is to be applied, further analysis is performed to select a data statement chunking scheme. A set of data operations are generated based at least in part on the selected data statement chunking scheme. The data operations are issued to a query engine for execution over the subject dataset. The results from the data operations are consolidated in accordance with the selected data statement chunking scheme and returned to the client. In certain embodiments, the client-specific rules and/or other client-specific data accessed to evaluate the rules are inaccessible by the query engine. In certain embodiments, the client-specific data comprise expanded dataset metadata (e.g., semantic information) that corresponds to the subject dataset.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1 presents a diagram 100 that depicts several implementation techniques pertaining to rule-based chunking of data statements for operation over large datasets in data storage environments. As an option, one or more variations of diagram 100 or any aspect thereof may be implemented in the context of the architecture and functionality of the embodiments described herein. The diagram 100 or any aspect thereof may be implemented in any environment.

The diagram shown in FIG. 1 is merely one example representation of the herein disclosed techniques that facilitate rule-based chunking of data statements for operation over large datasets in data storage environments. More specifically, and as shown in FIG. 1, the herein disclosed techniques facilitate chunking of data statements based at least in part on a set of client-specific data 114 (e.g., statement chunking rules, etc.) accessible in a client data statement processing layer 110. The client-specific data (e.g., fine-grained client-specific rules, etc.) are applied to divide (e.g., chunk) the data statements so as to facilitate cost reduction and/or failure rate reduction associated with executing the data statements over a subject dataset 146 in a data storage environment 140. The techniques disclosed herein address the problems attendant to managing the costs and/or failure rates associated with data operations that are performed over the subject dataset 146, particularly as the subject dataset 146 increases in size (e.g., number of input rows, number of result rows, etc.).

In the shown embodiment, the data statements for the subject dataset 146 are received from a client 102 (e.g., one or more users 104, one or more processes 106, etc.) at a data statement chunking agent 112 in the client data statement processing layer 110 (operation 1). The client-specific data 114 is consulted to determine a chunking scheme for the data statements (operation 2). As an example, the client-specific data 114 might comprise statement chunking rules from the client 102. The client-specific data 114 might further comprise performance data associated with data statements earlier processed in the client data statement processing layer 110. The client-specific data 114 might also comprise metadata describing certain characteristics (e.g., one or more data models) associated with the subject dataset 146 that are unique to the client 102 and/or to the client data statement processing layer 110. Other information may also be included in the client-specific data 114.

When the chunking scheme is determined, a data statement processing agent 116 executes one or more data operations over the subject dataset 146 in accordance with the chunking scheme (operation 3). A result set produced by the executed data operations is returned to the client 102 (operation 4). For example, if the chunking scheme calls for a single issued data statement to be chunked into N data statements, data operations to carry out the N data statements are generated and executed to return a result set in response to the single issued data statement.

Figure 2:
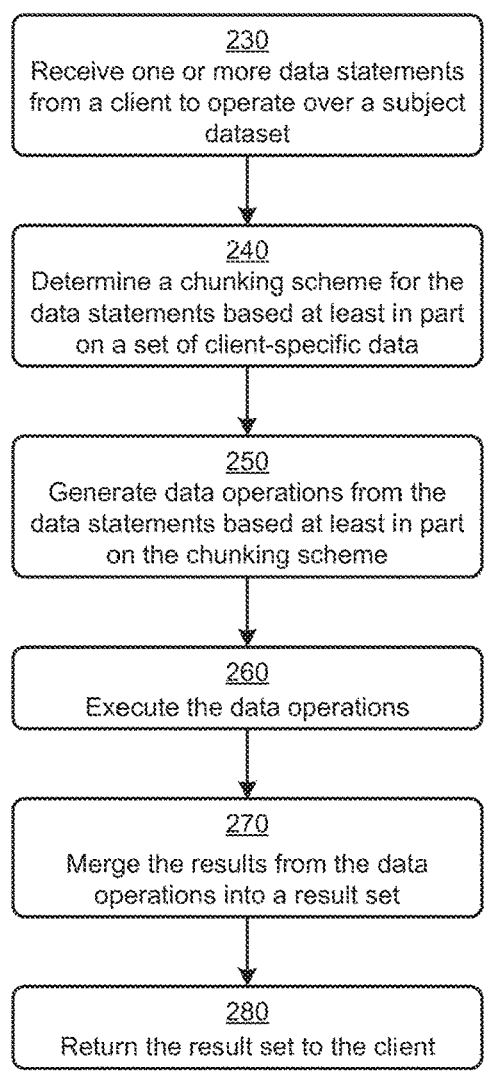
FIG. 2 depicts a data statement chunking technique as implemented in systems that facilitate rule-based chunking of data statements for operation over large datasets in data storage environments, according to an embodiment.

An embodiment of the herein disclosed techniques as implemented in a data statement chunking technique is shown and described as pertains to FIG. 2.

FIG. 2 depicts a data statement chunking technique 200 as implemented in systems that facilitate rule-based chunking of data statements for operation over large datasets in data storage environments. As an option, one or more variations of data statement chunking technique 200 or any aspect thereof may be implemented in the context of the architecture and functionality of the embodiments described herein. The data statement chunking technique 200 or any aspect thereof may be implemented in any environment.

The data statement chunking technique 200 presents one embodiment of certain steps and/or operations that facilitate rule-based chunking of data statements for operation over large datasets in data storage environments. As shown, the data statement chunking technique 200 can commence by receiving one or more data statements from a client to operate over a subject dataset (step 230). A chunking scheme for the data statements is determined based at least in part on a set of client-specific data (step 240). For example, the client-specific data might comprise a set of statement chunking rules, a set of performance data, a set of expanded dataset metadata, and/or other data specific to a client environment. One or more data operations corresponding to the data statements are generated based at least in part on the chunking scheme (step 250). The data operations are executed (step 260), and the results from the data operations are merged (step 270) into a result set that is returned to the client (step 280).

Figure 3:
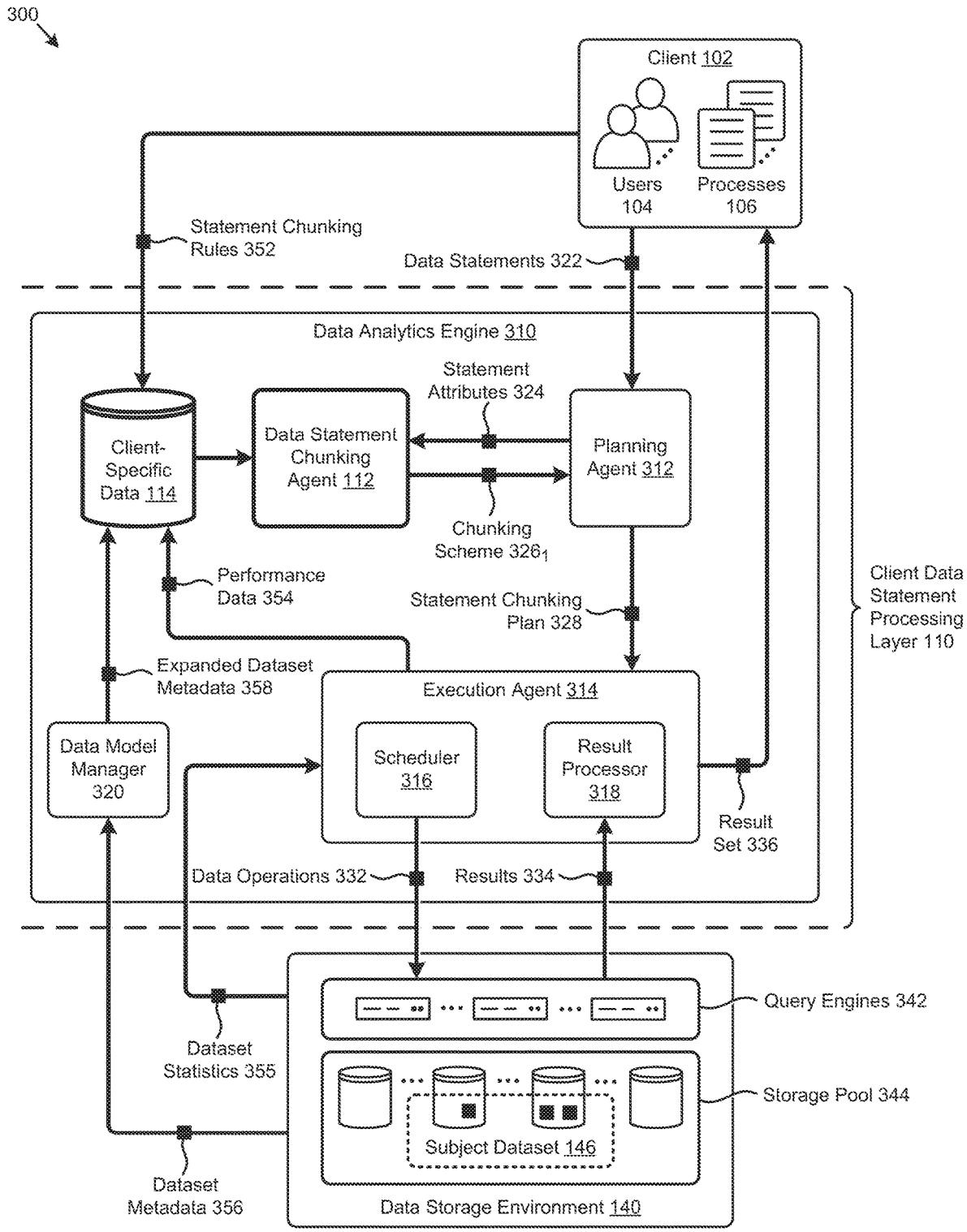
FIG. 3 shows a computing environment comprising a data analytics engine that facilitates rule-based chunking of data statements for operation over large datasets in data storage environments, according to an embodiment.

A detailed embodiment of a system and data flows that implement the techniques disclosed herein is presented and discussed as pertains to FIG. 3.

FIG. 3 shows a computing environment 300 comprising a data analytics engine that facilitates rule-based chunking of data statements for operation over large datasets in data storage environments. As an option, one or more variations of computing environment 300 or any aspect thereof may be implemented in the context of the architecture and functionality of the embodiments described herein.

As shown in the embodiment of FIG. 3, data statement chunking agent 112 is implemented in a data analytics engine 310 to facilitate rule-based chunking of data statements 322 issued for operation over subject dataset 146 stored in a storage pool 344 in data storage environment 140. In this embodiment, data analytics engine 310 serves to establish the client data statement processing layer 110 earlier described. As can be observed, a planning agent 312 at data analytics engine 310 receives the data statements 322 from client 102 (e.g., one or more users 104, one or more processes 106, etc.). For example, the data statements 322 might be issued from a data analysis application (e.g., business intelligence tool) managed by one of the users 104 (e.g., a data analyst). As another example, the data statements 322 might be issued by a process that calculates statistics, or a process that generates aggregated data. The planning agent 312 analyzes the data statements 322 to determine one or more statement attributes 324 associated with the data statements 322. As an example, the statement attributes 324 might describe the structure and/or constituents (e.g., clauses, predicates, expressions, etc.) of the data statements 322.

The data statement chunking agent 112 applies certain portions of the client-specific data 114 accessible by the data analytics engine 310 in the client data statement processing layer 110 to the statement attributes 324 to determine a chunking scheme $326_1$ (if any) for the data statements 322. As an example, the client-specific data 114 might comprise statement chunking rules 352 from the client 102 that are used to determine whether the data statements are to be chunked. Specifically, the statement chunking rules 352 might establish a set of logic that will invoke chunking operations if a certain threshold for a maximum allowed number of query input rows is breached. In some cases, a set of performance data 354 from the client-specific data 114 is consulted to determine one or more performance estimates (e.g., estimated processing cost, estimated processing time, etc.) for the data statements 322.

As shown, the performance data 354 may be derived by an execution agent 314 from data statements earlier processed at the data analytics engine 310. One or more of these performance estimates might be exposed to the statement chunking rules 352 to determine whether to invoke chunking operations. In some cases, certain portions of the performance data 354 may be derived from dataset statistics 355 presented by one or more components of the data storage environment 140. For example, the filesystem of the data storage environment 140 might provide information as to the size of the files comprising the subject dataset 146. As another example, one or more of the query engines 342 at the data storage environment 140 might present certain statistics and/or information pertaining to the subject dataset 146 (e.g., row counts, histogram information, number of distinct values, number of null values, etc.) that might be useful in determining whether to invoke chunking operations and/or in determining a chunking scheme.

If the data statements are to be chunked, a set of expanded dataset metadata 358 from the client-specific data 114 might be accessed to facilitate selection of the chunking scheme $326_1$. For example, the expanded dataset metadata 358 can be accessed to determine one or more dimensions associated with the subject dataset 146 that might serve as a chunking dimension. As can be observed in FIG. 3, the expanded dataset metadata 358 is derived at least in part from a set of dataset metadata 356 by a data model manager 320 at the data analytics engine 310. The data model manager 320 might facilitate the generation of relationships and/or other characteristics associated with the subject dataset 146 that are included in the expanded dataset metadata 358, but are not included in the dataset metadata 356 from the data storage environment 140. In some cases, the expanded dataset metadata 358 is generated based at least in part on input (e.g., data model design specifications, etc.) from client 102.

The chunking scheme $326_1$ determined by the data statement chunking agent 112 is received by the planning agent 312 to generate a statement chunking plan 328 that is delivered to the execution agent 314. A scheduler 316 at the execution agent 314 issues one or more data operations 332 to one or more query engines 342 at the data storage environment 140 in accordance with the statement chunking plan 328. In some cases, the data operations 332 comprise execution directives that control the execution of the data operations 332 at the execution agent 314 and/or the data storage environment 140. As an example, an execution directive might indicate that the results 334 from the data operations 332 issued to the query engines 342 are to be merged by a result processor 318 at the execution agent 314 into a result set 336. The result set 336 can then be accessed by client 102.

As can be concluded from the foregoing discussion pertaining to FIG. 3 and/or other discussions herein, data statement chunking in accordance with the herein disclosed techniques is facilitated in environments with access to the client-specific data 114, at least as described and/or implemented herein. As an example, while such data statement chunking can be implemented at the data analytics engine 310 in the client data statement processing layer 110 of FIG. 3, data statement chunking according to the herein disclosed techniques is not performed in other environments that lack access to the client-specific data 114. Specifically, a lack of access to the client-specific data 114 by the query engines 342 in data storage environment 140 precludes the performance of data statement chunking according to the herein disclosed techniques at the query engines 342.

Figure 4A:
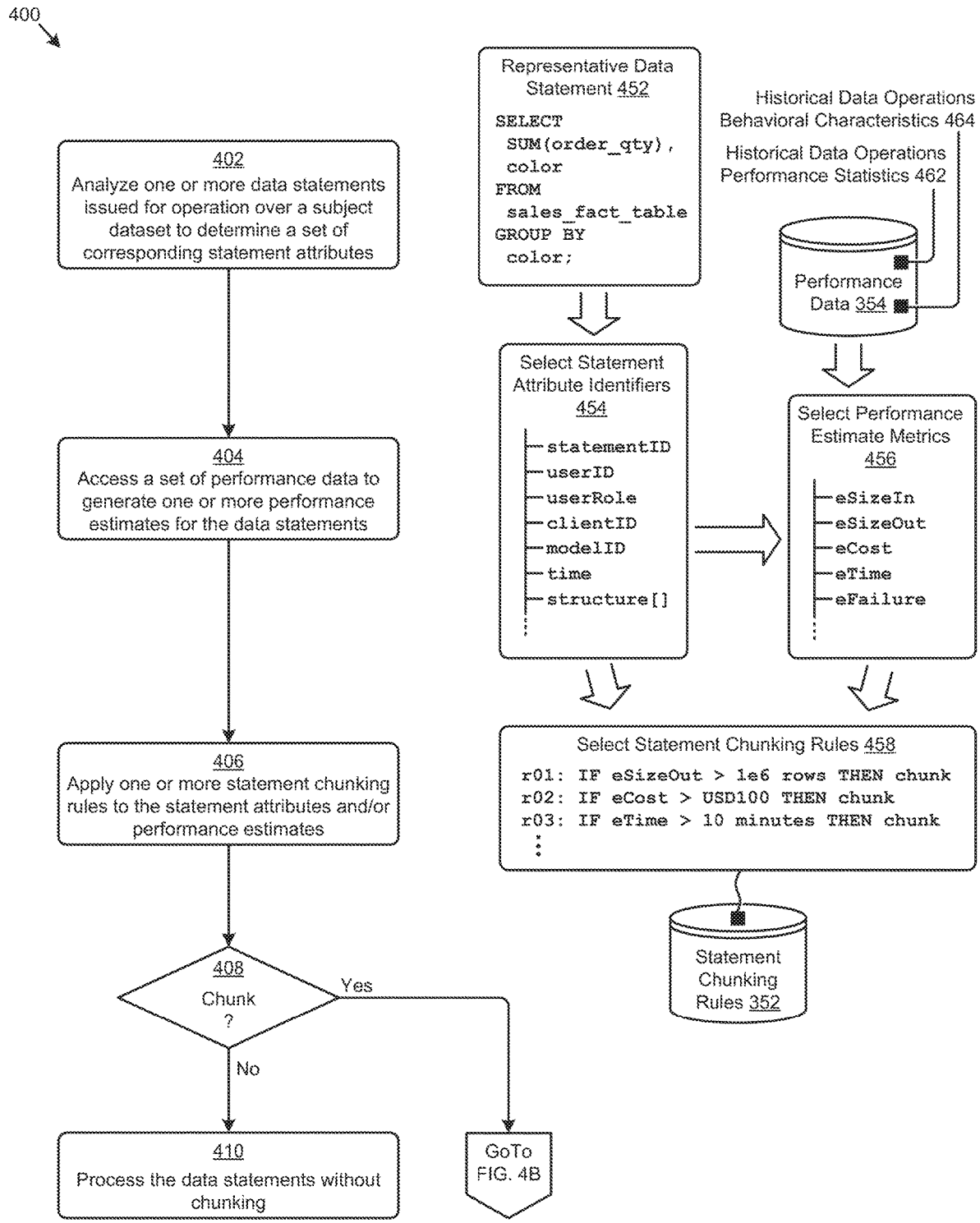
FIG. 4A and FIG. 4B illustrate a data statement chunking scheme selection technique as implemented in systems that facilitate rule-based chunking of data statements for operation over large datasets in data storage environments, according to an embodiment.
Figure 4B:
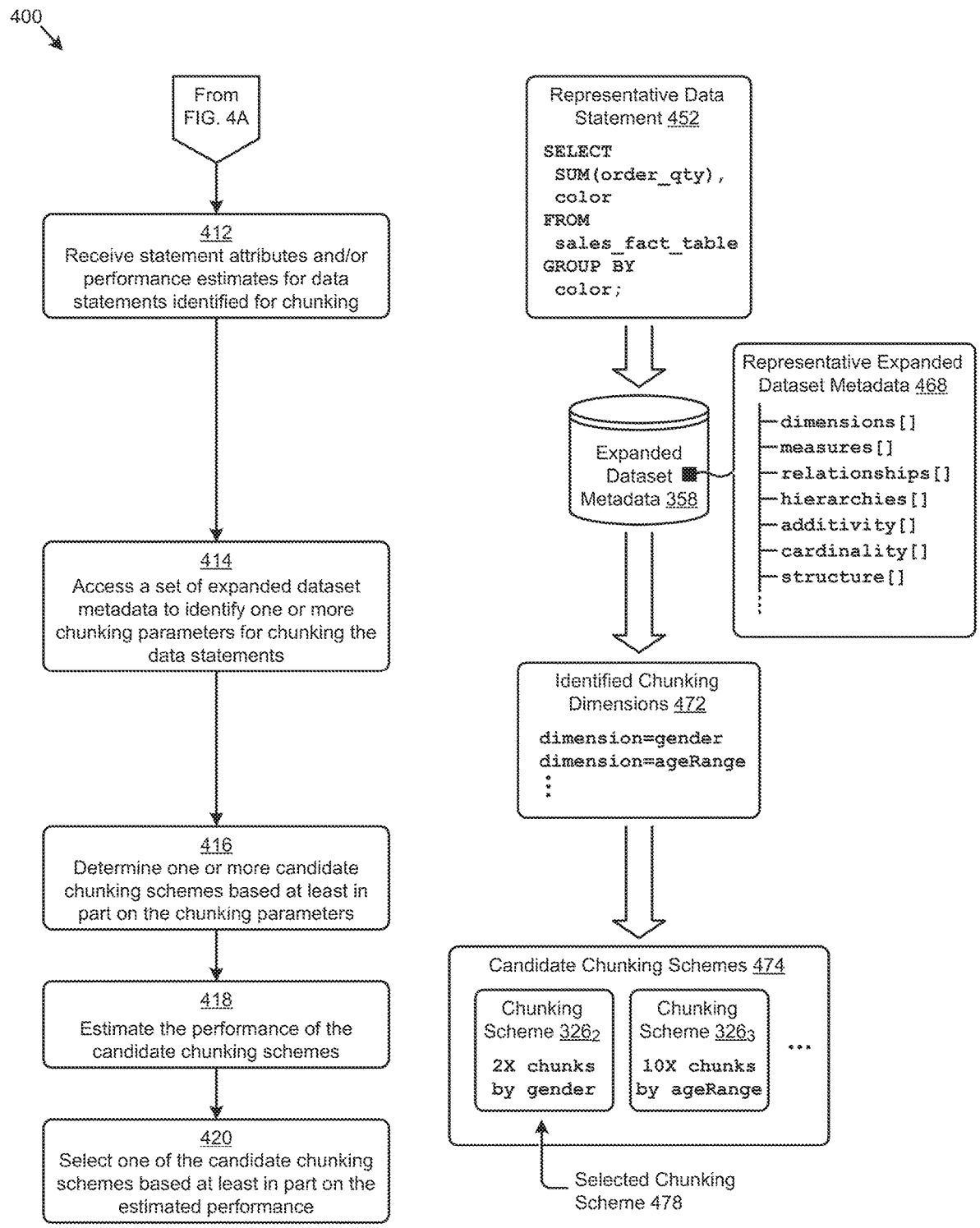

Further details pertaining to selecting a data statement chunking scheme according to the herein disclosed techniques are shown and described as pertains to FIG. 4A and FIG. 4B.

FIG. 4A and FIG. 4B illustrate a data statement chunking scheme selection technique 400 as implemented in systems that facilitate rule-based chunking of data statements for operation over large datasets in data storage environments. As an option, one or more variations of data statement chunking scheme selection technique 400 or any aspect thereof may be implemented in the context of the architecture and functionality of the embodiments described herein. The data statement chunking scheme selection technique 400 or any aspect thereof may be implemented in any environment.

The data statement chunking scheme selection technique 400 presents one embodiment of certain steps and/or operations that select a chunking scheme when performing rule-based chunking of data statements for operation over large datasets in data storage environments, according to the herein disclosed techniques. Various illustrations are also presented to illustrate the data statement chunking scheme selection technique 400. Further, specialized data structures designed to improve the way a computer stores and retrieves data in memory when performing steps and/or operations pertaining to data statement chunking scheme selection technique 400 are also shown in FIG. 4A and FIG. 4B.

As shown, the data statement chunking scheme selection technique 400 can commence by analyzing one or more data statements issued for operation over a subject dataset to determine a set of corresponding statement attributes (step 402). For example, various statement attributes corresponding to the select statement attribute identifiers 454 might be derived from the representative data statement 452 issued for operation over a "sales_fact_table" dataset. The statement attributes and/or any other data described herein can be organized and/or stored using various techniques.

For example, the select statement attribute identifiers 454 indicate that the statement attributes might be organized and/or stored in a tabular structure (e.g., relational database table), which has rows that relate various statement attributes with a particular data statement. As another example, the information might be organized and/or stored in a programming code object that has instances corresponding to a particular data statement and properties corresponding to the various attributes associated with the data statement. Specifically, and as depicted in select statement attribute identifiers 454, a data record (e.g., table row or object instance) for a particular data statement might describe a statement identifier (e.g., stored in a "statementID" field), a user identifier (e.g., stored in a "userID" field), a user role identifier (e.g., stored in a "userRole" field), a client identifier (e.g., stored in a "clientID" field), a data model identifier (e.g., stored in a "modelID" field), a timestamp (e.g., stored in a "time" field), a set of structure constituents describing the structure of the data statement (e.g., stored in a "structure [ ]" object), and/or other user attributes.

The data statement chunking scheme selection technique 400 also accesses a set of performance data to generate one or more performance estimates for the data statements (step 404). For example, a set of historical data operations performance statistics 462 and/or a set of historical data operations behavioral characteristics 464 from the performance data 354 earlier discussed might be used to form a performance predictive model that can be applied to the data statements to generate the performance estimates.

As can be observed in a set of select performance estimate metrics 456, the performance estimates generated for a particular data statement might include an estimate of the number of input rows addressed by the data statement (e.g., stored in an "eSizeIn" field), an estimate of the number of output rows resulting from execution of the data statement (e.g., stored in an "eSizeOut" field), an estimate of the cost of executing the data statement (e.g., stored in an "eCost" field), an estimate of the time to execute the data statement (e.g., stored in an "eTime" field), an estimate of the execution failure probability associated with the data statement (e.g., stored in an "eFailure" field), and/or other performance estimates. In certain embodiments, the performance estimates for a particular data statement can be stored and/or organized in a data structure that also includes the statement attributes corresponding to the data statement.

The data statement chunking scheme selection technique 400 can continue with applying one or more statement chunking rules to the statement attributes and/or the performance estimates corresponding to the data statements (step 406). As an example, the select statement chunking rules 458 from the statement chunking rules 352 earlier discussed might be applied to the statement attributes and/or performance estimates pertaining to the representative data statement 452. The statement chunking rules are evaluated to determine whether to chunk or not chunk the data statements (decision 408). For example, rule "r01", rule "r02", and rule "r03" of the select statement chunking rules 458 respectively compare "eSizeOut", "eCost", and "eTime" to certain threshold values to determine whether to chunk the data statement. If the application of the statement chunking rules indicate no chunking is to be performed (e.g., the foregoing rule comparisons all evaluate to "false") (see "No" path of decision 408), then the data statements are processed without chunking (step 410). If the application of the statement chunking rules indicate chunking is to be performed (e.g., at least one of the foregoing rule comparisons evaluate to "true") (see "Yes" path of decision 408), then the data statement chunking scheme selection technique 400 continues with steps and/or operations for determining how to chunk the data statements.

Referring to FIG. 4B, the data statement chunking scheme selection technique 400 receives statement attributes and/or performance estimates for data statements (e.g., representative data statement 452) identified for chunking (step 412). A set of expanded dataset metadata is accessed to identify one or more chunking parameters for chunking the data statements (step 414). For example, and as illustrated, the expanded dataset metadata 358 might be accessed to identify the chunking parameters. As earlier discussed, the expanded dataset metadata 358 is a rich set of metadata derived from certain information about the subject dataset that is associated with the data statements. In certain embodiments, the expanded dataset metadata 358 is available in a set of client-specific data that facilitates the herein disclosed techniques.

As can be observed in a set of representative expanded metadata 468, the expanded dataset metadata 358 might described, for a particular subject dataset, a set of dimensions (e.g., stored in a "dimensions [ ]" object), a set of measures (e.g., stored in a "measures [ ]" object), a set of relationships (e.g., stored in a "relationships [ ]" object), a set of hierarchies (e.g., stored in a "hierarchies [ ]" object), a set of additivity characteristics (e.g., stored in a "additivity [ ]" object), a set of cardinality characteristics (e.g., stored in a "cardinality [ ]" object), a set of structure characteristics (e.g., stored in a "structure [ ]" object), and/or other metadata associated with the subject dataset. For example, the cardinality characteristics might include histograms, skews, count of empty or null fields, correlations to various attributes (e.g., keys, columns, etc.), and/or other characteristics. In the example shown in FIG. 4A, the expanded dataset metadata 358 is accessed to determine a set of identified chunking dimensions 472 (e.g., "gender", "ageRange", etc.) for chunking the data statements. In this case, the expanded dataset metadata 358 facilitates the identification of dimensions (e.g., "gender", "ageRange", etc.) for chunking that would otherwise not be known (e.g., merely from the data statement attributes).

Using the chunking parameters (e.g., dimensions) identified for chunking the data statements, a set of candidate chunking schemes are determined (step 416). As shown, a set of candidate chunking schemes 474 based at least in part on the identified chunking dimensions 472 comprise a chunking scheme 326$_2$ that will chunk the data statements into "2× chunks by gender" and a chunking scheme 326$_3$ that will chunk the data statements into "10× chunks by ageRange". Other chunking parameters and/or candidate chunking schemes are possible. The candidate chunking schemes are analyzed to estimate the performance of each scheme (step 418). For example, certain performance estimates (e.g., cost, time, failure rate, etc.) can be generated for the candidate chunking schemes 474. One of the candidate chunking schemes is then selected from the candidate chunking schemes based at least in part on the performance estimates of the schemes (step 420). The chunking scheme 326$_2$ (e.g., "2× chunks by gender") might be selected as the selected chunking scheme 478 since the estimated resource cost to execute two data statement chunks over the subject dataset is less than the estimated resource cost to execute 10 data statement chunks over the subject dataset as specified by chunking scheme 326$_3$ (e.g., "10× chunks by ageRange").

Figure 5A:
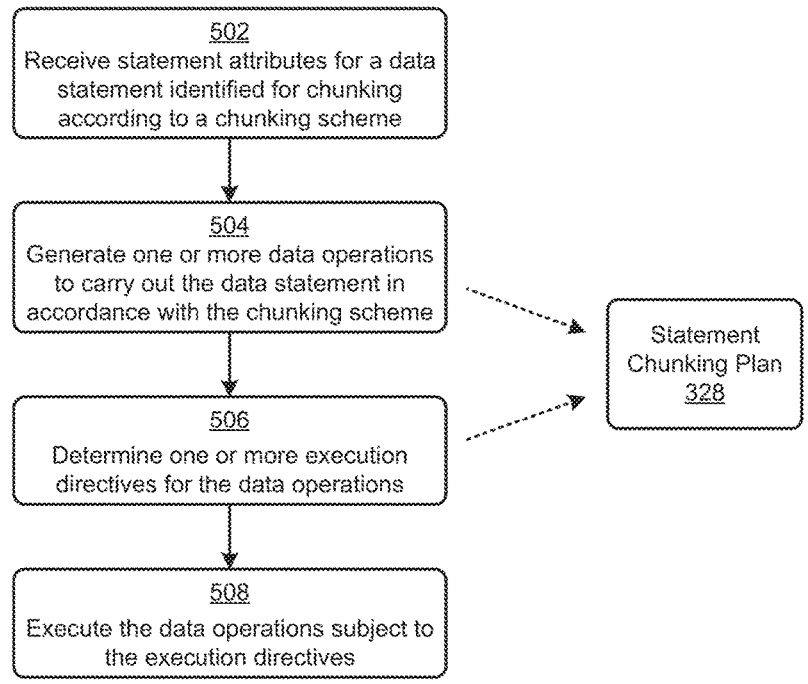
FIG. 5A and FIG. 5B present a data operations generation technique as implemented in systems that facilitate rule-based chunking of data statements for operation over large datasets in data storage environments, according to an embodiment.
Figure 5B:
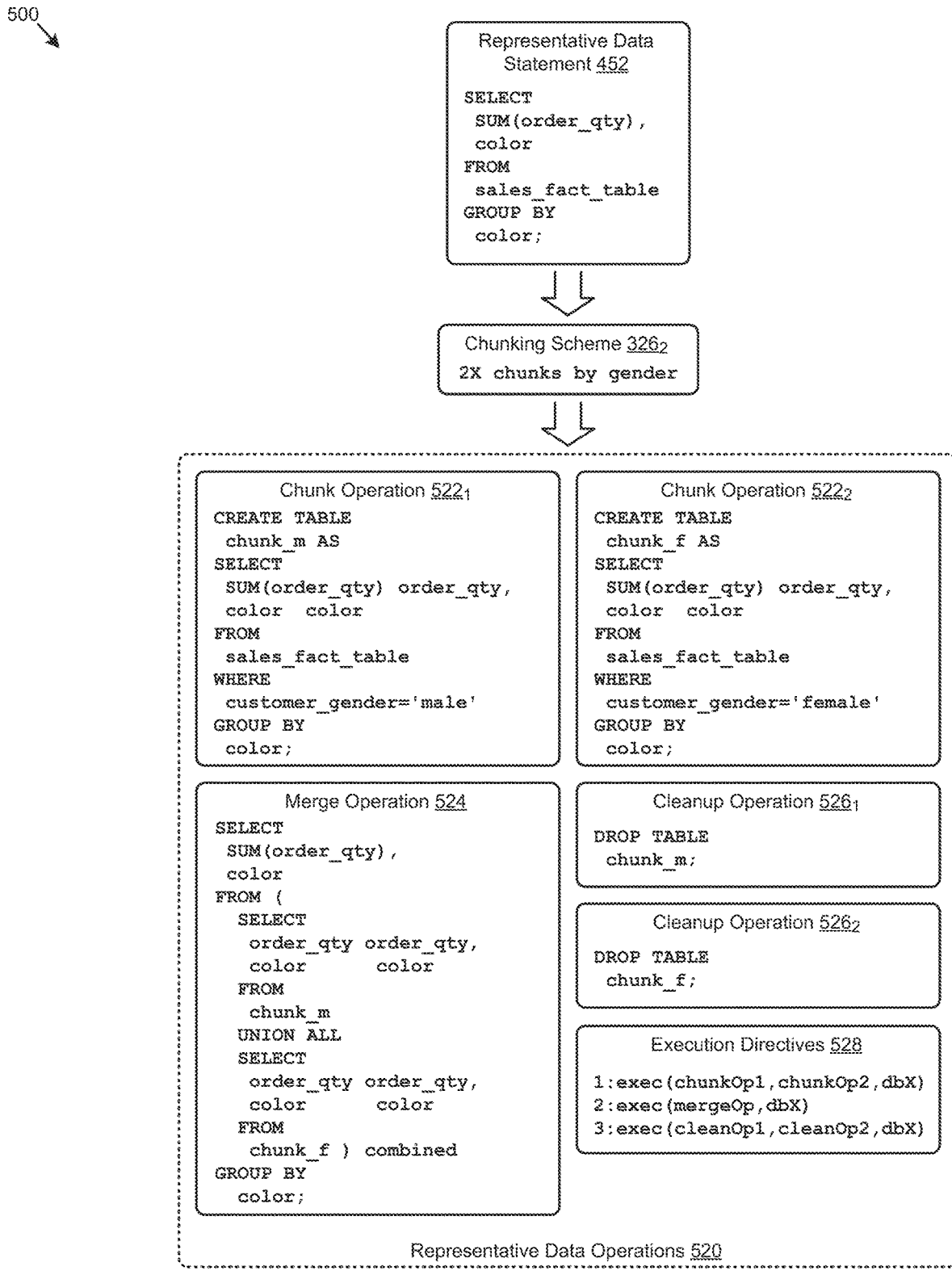

Further details pertaining to generating data operations for a particular chunking scheme according to the herein disclosed techniques are shown and described as pertains to FIG. 5A and FIG. 5B.

FIG. 5A and FIG. 5B present a data operations generation technique 500 as implemented in systems that facilitate rule-based chunking of data statements for operation over large datasets in data storage environments. As an option, one or more variations of data operations generation technique 500 or any aspect thereof may be implemented in the context of the architecture and functionality of the embodiments described herein. The data operations generation technique 500 or any aspect thereof may be implemented in any environment.

The data operations generation technique 500 presents one embodiment of certain steps and/or operations that generate data operations to carry out data statements that are chunked according to the herein disclosed techniques. Example pseudo-code are also presented to illustrate the data operations generation technique 500.

As shown in FIG. 5A, the data operations generation technique 500 can commence by receiving statement attributes for a data statement identified for chunking in accordance with a certain chunking scheme (step 502). One or more data operations are generated to carry out the data statement in accordance with the chunking scheme (step 504). One or more execution directives are determined for the data operations (step 506) to facilitate execution of the data operations (step 508). For example, the execution directives might be consulted when scheduling one or more of the data operations for execution at a query engine associated with the subject dataset. Specifically, the execution directives might indicate that certain data operations are to be executed in parallel, in sequence, asynchronously, or synchronously. The execution directives might also indicate where certain partial results (e.g., from each of the chunks) are to be stored. As shown, the data operations and the execution directives might comprise an instance of a statement chunking plan 328.

Referring to FIG. 5B, an example set of representative data operations 520 generated according to the data operations generation technique 500 and/or other herein disclosed techniques is shown. As can be observed, the representative data operations 520 represent data operations generated to carry out chunking of the representative data statement 452 in accordance with the chunking scheme 326$_2$ (e.g., "2× chunks by gender"). Specifically, the representative data operations 520 comprise two chunk operations, chunk operation 522$_1$ and chunk operation 522$_2$, that correspond to the representative data statement 452 as chunked "by gender".

As shown, chunk operation 522$_1$ creates a "chunk_m" table corresponding to "customer_gender='male'" and chunk operation 522$_2$ creates a "chunk_f" table corresponding to "customer_gender='female'". A merge operation 524 is generated to merge the results from the "chunk_m" table and the "chunk_f" table. In some cases, such a merge operation can be performed at a client agent (e.g., BI application) associated with the client issuing the data statement, while in other cases the merge operation can be performed at an execution agent in a client data statement processing layer. The results of each chunk operation might also be streamed to a client agent as the results become available. For example, results might be streamed to a client agent when no subsequent aggregation is to be performed, and/or when the client specifies the chunking dimension (e.g., "gender").

A set of cleanup operations, cleanup operation $526_1$ and cleanup operation $526_2$, are generated to drop the "chunk_m" table and the "chunk_f" table. A set of execution directives 528 are also generated to facilitate the execution of the data operations. Specifically, execution directives 528 indicate the chunk operation $522_1$ (e.g., identified as "chunkOp1") and chunk operation $522_2$ (e.g., identified as "chunkOp2") are to be executed in parallel with results stored at database "dbX". The merge operation 524 (e.g., identified as "mergeOp") is to be executed in sequence with the chunk operations on tables stored in database "dbX". The execution directives 528 further specify that cleanup operation $526_1$ (e.g., identified as "cleanOp1") and cleanup operation $526_2$ (e.g., identified as "cleanOp2") are to be executed in parallel in response to the completion of merge operation 524. The result set produced by the merge operation 524 can then be presented to the client that issued the representative data statement 452.

ADDITIONAL EMBODIMENTS OF THE DISCLOSURE

Additional Practical Application Examples

Figure 6:
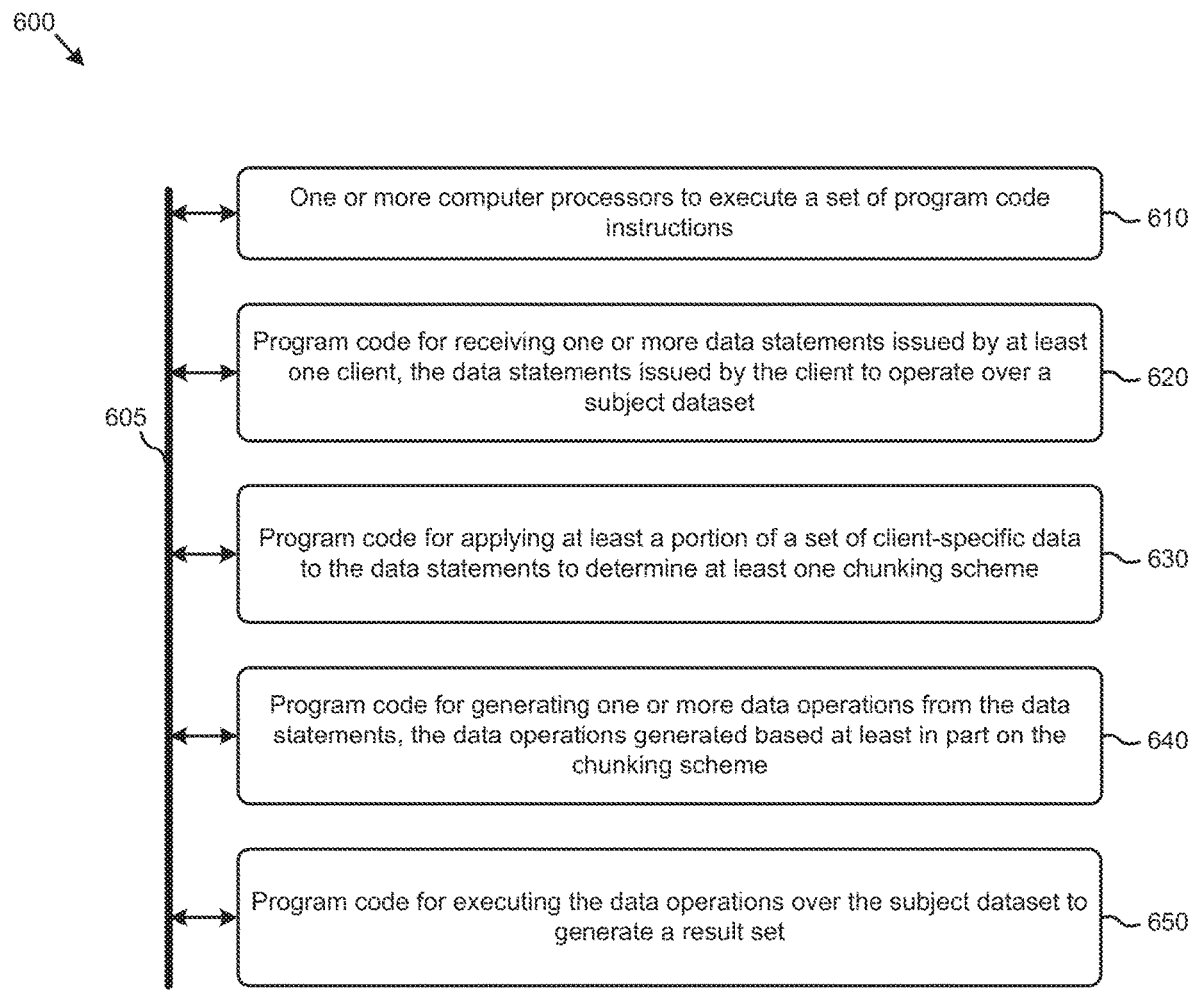
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that, individually and/or as combined, serve to form improved technological processes that address reducing the client-specific costs and/or failure rates associated with data operations that are performed over large datasets. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment. The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The shown embodiment implements a portion of a computer system, presented as system 600, comprising one or more computer processors to execute a set of program code instructions (module 610) and modules for accessing memory to hold program code instructions to perform: receiving one or more data statements issued by at least one client, the data statements issued by the client to operate over a subject dataset (module 620); applying at least a portion of a set of client-specific data to the data statements to determine at least one chunking scheme (module 630); generating one or more data operations from the data statements, the data operations generated based at least in part on the chunking scheme (module 640); and executing the data operations over the subject dataset to generate a result set (module 650).

Variations of the foregoing may include more or fewer of the shown modules. Certain variations may perform more or fewer (or different) steps, and/or certain variations may use data elements in more, or in fewer (or different) operations.

SYSTEM ARCHITECTURE OVERVIEW

Additional System Architecture Examples

Figure 7A:
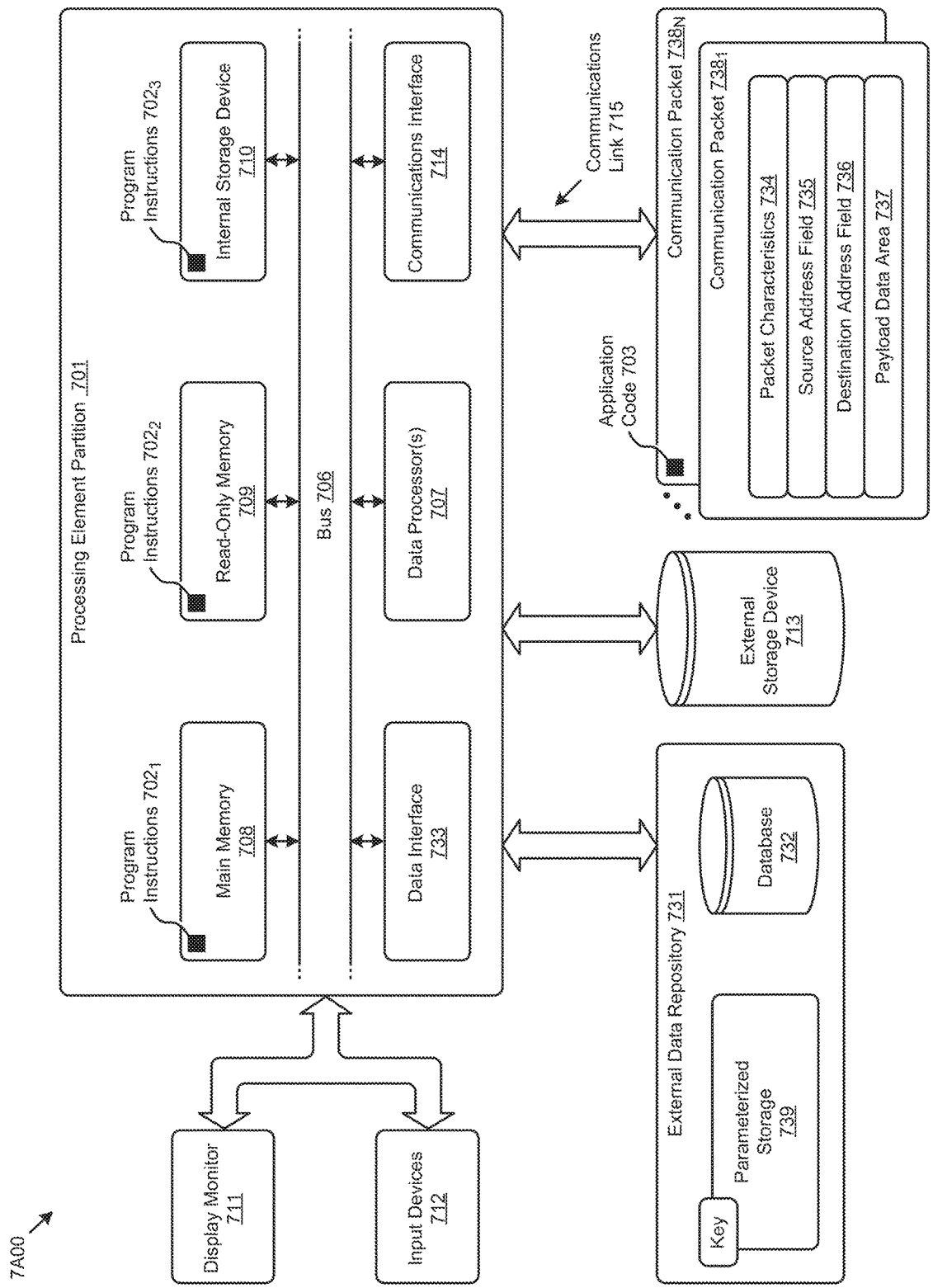
FIG. 7A and FIG. 7B present block diagrams of computer system architectures having components suitable for implementing embodiments of the present disclosure and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a CPU, or a multi-core CPU (e.g., data processor 707), a system memory (e.g., main memory 708, or an area of random access memory (RAM)), a non-volatile storage device or non-volatile storage area (e.g., read-only memory or ROM 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. The shown computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communications packet $738_1$, communications packet $738_N$) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of computer system 7A00. According to certain embodiments of the disclosure, two or more instances of computer system 7A00 coupled by a communications link 715 (e.g., LAN, PTSN, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). A module may include one or more state machines and/or combinational logic used to implement or facilitate the operational and/or performance characteristics pertaining to data access authorization for dynamically generated database structures.

Various implementations of the database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of data access authorization for dynamically generated database structures). Such files or records can be brought into and/or stored in volatile or non-volatile memory.

Figure 7B:
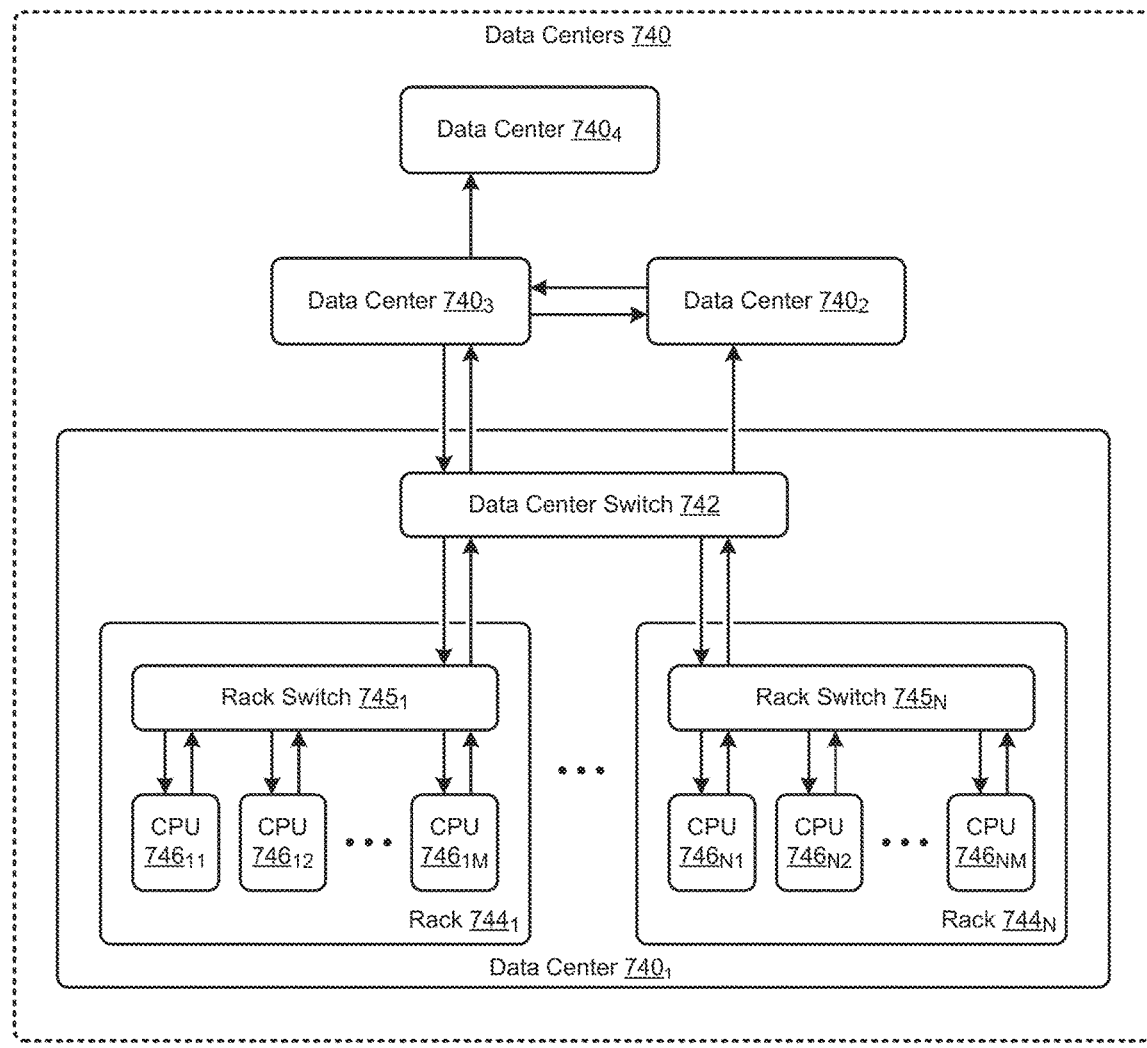

FIG. 7B depicts a block diagram of an instance of a distributed data processing system 7B00 that may be included in a system implementing instances of the herein-disclosed embodiments.

Distributed data processing system 7B00 can include many more or fewer components than those shown. Distributed data processing system 7B00 can be used to store data, perform computational tasks, and/or transmit data between a plurality of data centers 740 (e.g., data center $740_1$, data center $740_2$, data center $740_3$, and data center $740_4$). Distributed data processing system 7B00 can include any number of data centers. Some of the plurality of data centers 740 might be located geographically close to each other, while others might be located far from the other data centers.

The components of distributed data processing system 7B00 can communicate using dedicated optical links and/or other dedicated communication channels, and/or supporting hardware such as modems, bridges, routers, switches, wireless antennas, wireless towers, and/or other hardware components. In some embodiments, the component interconnections of distributed data processing system 7B00 can include one or more wide area networks (WANs), one or more local area networks (LANs), and/or any combination of the foregoing networks. In certain embodiments, the component interconnections of distributed data processing system 7B00 can comprise a private network designed and/or operated for use by a particular enterprise, company, customer, and/or other entity. In other embodiments, a public network might comprise a portion or all of the component interconnections of distributed data processing system 7B00.

In some embodiments, each data center can include multiple racks that each include frames and/or cabinets into which computing devices can be mounted. For example, as shown, data center $740_1$ can include a plurality of racks (e.g., rack $744_1$, ..., rack $744_N$), each comprising one or more computing devices. More specifically, rack $744_1$ can include a first plurality of CPUs (e.g., CPU $746_{11}$, CPU $746_{12}$, ..., CPU $746_{1M}$), and rack $744_N$ can include an Nth plurality of CPUs (e.g., CPU $746_{N1}$, CPU $746_{N2}$, ..., CPU $746_{NM}$). The plurality of CPUs can include data processors, network attached storage devices, and/or other computer controlled devices. In some embodiments, at least one of the plurality of CPUs can operate as a master processor, controlling certain aspects of the tasks performed throughout the distributed data processing system 7B00. For example, such master processor control functions might pertain to scheduling, data distribution, and/or other processing operations associated with the tasks performed throughout the distributed data processing system 7B00. In some embodiments, one or more of the plurality of CPUs may take on one or more roles, such as a master and/or a slave. One or more of the plurality of racks can further include storage (e.g., one or more network attached disks) that can be shared by one or more of the CPUs.

In some embodiments, the CPUs within a respective rack can be interconnected by a rack switch. For example, the CPUs in rack $744_1$ can be interconnected by a rack switch $745_1$. As another example, the CPUs in rack $744_N$ can be interconnected by a rack switch $745_N$. Further, the plurality of racks within data center $740_1$ can be interconnected by a data center switch 742. Distributed data processing system 7B00 can be implemented using other arrangements and/or partitioning of multiple interconnected processors, racks, and/or switches. For example, in some embodiments, the plurality of CPUs can be replaced by a single large-scale multiprocessor.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for chunking data statements based at least in part on a set of client-specific data in a client data statement processing layer, the method comprising:
   receiving a set of data statements issued by a client, the data statements issued by the client to operate over a subject dataset;
   analyzing the set of data statements to determine statement attributes associated with the data statements;
   applying a set of client-specific data to the statement attributes to determine a chunking scheme, the set of client-specific data including performance data, statement chunking rules, and a set of expanded dataset metadata, the set of expanded dataset metadata derived from client input and first dataset metadata, the first dataset metadata derived from the subject dataset, the statement chunking rules indicative of a dimension based chunking for data statements;
   expanding the dataset metadata into a set of expanded dataset metadata;
   consulting the expanded dataset metadata to perform at least one of determining the at least one chunking scheme, or generating one or more data operations;
   based on consulting the expanded dataset metadata, generating a set of data operations from the set of data statements, the set of data operations generated based on the chunking scheme and one or more dimensions associated with the subject dataset based on the expanded dataset metadata;
   accessing the performance data;
   via the performance data, generating first performance estimates associated with the set of data statements;
   applying the statement chunking rules to the first performance estimates to determine whether to invoke chunking on the set of data statements, and if so,
   applying select statement chunking rules for accessing the set of expanded dataset metadata based on field specific attributes in the expanded dataset metadata to determine chunking parameters for chunking the set of data statements, the select statement chunking rules denoting the first performance estimates based on metrics derived from field specific performance, the select statements derived from the set of data statements;
   generating a set of candidate chunking schemes from the chunking parameters;
   accessing the performance data to generate second performance estimates for the set of candidate chunking schemes;
   selecting the chunking scheme from the set of candidate chunking schemes based on the second performance estimates; and
   executing the set of data operations over the subject dataset to generate a result set.

2. The method of claim 1, wherein the set of data operations are executed at one or more query engines, and wherein the client-specific data is inaccessible by the one or more query engines.

3. The method of claim 1, wherein the performance data includes historical data operations performance statistics, and historical data operations behavioral characteristics.

4. The method of claim 1, further comprising merging two or more results from the set of data operations into the result set.

5. The method of claim 1, wherein the set of data operations are executed in accordance with execution directives, the execution directives indicating how to execute the set of data operations.

6. A computer readable medium, embodied in a non-transitory computer readable medium, the non-transitory computer readable medium having stored thereon a sequence of instructions which, when stored in memory and executed by one or more processors causes the one or more processors to perform a set of acts for chunking data statements based at least in part on a set of client-specific information in a client data statement processing layer, the acts comprising:
   receiving a set of data statements issued by a client, the data statements issued by the client to operate over a subject dataset;
   analyzing the set of data statements to determine statement attributes associated with the data statements;
   applying a set of client-specific data to the statement attributes to determine a chunking scheme, the set of client-specific data including performance data, statement chunking rules, and a set of expanded dataset metadata, the set of expanded dataset metadata derived from client input and first dataset metadata, the first dataset metadata derived from the subject dataset, the statement chunking rules indicative of a dimension based chunking for data statements;

receiving a set of dataset metadata associated with the subject dataset;

expanding the dataset metadata into a set of expanded dataset metadata;

consulting the expanded dataset metadata to perform at least one of, determining the at least one chunking scheme, or generating the one or more data operations;

based on consulting the expanded dataset metadata, generating data operations from the set of data statements, the data operations generated based on the chunking scheme and on one or more dimensions associated with the subject dataset based on the expanded dataset metadata;

accessing the performance data;

via the performance data, generating first performance estimates associated with the set of data statements;

applying the statement chunking rules to the first performance estimates to determine whether to invoke chunking on the set of data statements, and if so, applying select statement chunking rules for accessing the set of expanded dataset metadata based on field specific attributes in the expanded dataset metadata to determine chunking parameters for chunking the set of data statements, the select statement chunking rules denoting the first performance estimates based on metrics derived from field specific performance, the select statements derived from the set of data statements;

generating a set of candidate chunking schemes from the chunking parameters;

accessing the performance data to generate second performance estimates for the set of candidate chunking schemes;

selecting the chunking scheme from the set of candidate chunking schemes based on the second performance estimates; and executing the data operations over the subject dataset to generate a result set.

7. The computer readable medium of claim 6, wherein the client-specific data comprises at least one of: one or more statement chunking rules, a set of enhanced dataset metadata, or a set of performance data.

8. The computer readable medium of claim 6, wherein the data operations are executed at one or more query engines, and wherein the client-specific data is inaccessible by the one or more query engines.

9. The computer readable medium of claim 6, further comprising instructions which, when stored in memory and executed by the one or more processors causes the one or more processors to perform acts of:

analyzing the data statements to determine the statement attributes associated with the data statements; and applying the set of the client-specific data to at least one of the statement attributes to perform at least one of, determining the at least one chunking scheme, or generating the one or more data operations.

10. The computer readable medium of claim 6, further comprising instructions which, when stored in memory and executed by the one or more processors causes the one or more processors to perform acts of:

generating one or more performance estimates associated with the data statements in the set; and applying the set of the client-specific data to at least one of the performance estimates to perform at least one of, determining the at least one chunking scheme, or generating the one or more data operations.

11. The computer readable medium of claim 10, wherein at least one of the performance estimates is based at least in part on a set of performance data.

12. The computer readable medium of claim 11, wherein the performance data comprises at least one of, a set of historical data operations performance statistics, or a set of historical data operations behavioral characteristics.

13. A system for chunking data statements based at least in part on a set of client-specific information in a client data statement processing layer, the system comprising:

a storage medium having stored thereon a sequence of instructions; and one or more processors that execute the instructions to cause the one or more processors to perform a set of acts, the acts comprising:

receiving one or more data statements issued by at least one client, the data statements issued by the client to operate over a subject dataset;

applying at least a portion of a set of client-specific data to the data statements to determine at least one chunking scheme, the set of client-specific data including performance data, statement chunking rules, and a set of expanded dataset metadata, the set of expanded dataset metadata derived from client input and first dataset metadata, the first dataset metadata derived from the subject dataset, the statement chunking rules indicative of a dimension based chunking for data statements;

expanding a dataset metadata into a set of expanded dataset metadata;

consulting the expanded dataset metadata to perform at least one of determining the at least one chunking scheme, or generating one or more data operations;

based on consulting the expanded dataset metadata, generating the one or more data operations from the data statements, the data operations generated based at least in part on the chunking scheme and on one or more dimensions associated with the subject dataset based on the expanded dataset metadata;

accessing the performance data;

via the performance data, generating first performance estimates associated with the set of data statements;

applying the statement chunking rules to the first performance estimates to determine whether to invoke chunking on the set of data statements, and if so, applying select statement chunking rules for accessing the set of expanded dataset metadata based on field specific attributes in the expanded dataset metadata to determine chunking parameters for chunking the set of data statements, the select statement chunking rules denoting the first performance estimates based on metrics derived from field specific performance, the select statements derived from the set of data statements;

generating a set of candidate chunking schemes from the chunking parameters;

accessing the performance data to generate second performance estimates for the set of candidate chunking schemes;

selecting the chunking scheme from the set of candidate chunking schemes based on the second performance estimates; and executing the data operations over the subject dataset to generate a result set.

14. The system of claim 13, wherein the client-specific data comprises at least one of, one or more statement chunking rules, a set of enhanced dataset metadata, or a set of performance data.

15. The method as in claim 1, further comprising:
generating a performance predictive model derived from the performance data; and
applying the performance predictive model to the set of data statements to generate the first performance estimates.

16. The method as in claim 15, further comprising:
accessing the set of expanded dataset metadata to determine chunking parameters for chunking the set of data statements;
generating a set of candidate chunking schemes from the chunking parameters;
accessing the performance data to generate second performance estimates for the set of candidate chunking schemes; and
selecting the chunking scheme from the set of candidate chunking schemes based on the second performance estimates.

17. The method as in claim 1, further comprising:
accessing the set of expanded dataset metadata to determine chunking parameters for chunking the set of data statements;
generating a set of candidate chunking schemes from the chunking parameters;
accessing the performance data to generate second performance estimates for the set of candidate chunking schemes; and
selecting the chunking scheme from the set of candidate chunking schemes based on the second performance estimates.

18. The method as in claim 16, wherein the chunking parameters include: a set of dimensions, a set of measures, a set of relationships, a set of hierarchies, a set of additivity characteristics, a set of cardinality characteristics, and a set of structure characteristics.

19. The method as in claim 1 further comprising:
generating a performance predictive model from the performance data;
applying the performance predictive model to the set of data statements to generate first performance estimates;
utilizing the first performance estimates to determine whether to invoke chunking of the data statements in the set;
utilizing the performance data to generate second performance estimates; and
utilizing the second performance estimates to select the chunking scheme.

20. A method comprising:
receiving a set of data statements issued by a client, the set of data statements issued by the client to operate over a subject dataset;
analyzing the set of data statements to determine statement attributes associated with the data statements;
expanding dataset metadata into a set of expanded dataset metadata;
accessing a set of client-specific data, the set of client-specific data including performance data, statement chunking rules, and the set of expanded dataset metadata, the set of expanded dataset metadata derived at least in part from client input and dataset metadata, the dataset metadata derived from the subject dataset the statement chunking rules indicative of a dimension based chunking for data statements;
generating a performance predictive model derived from the performance data, the performance data including historical data operations, performance statistics, and historical data operations behavioral characteristics;
applying the performance predictive model to the set of statement attributes to generate performance estimates;
applying the statement chunking rules to the performance estimates to determine whether to invoke chunking on the set of data statements;
applying select statement chunking rules for accessing the set of expanded dataset metadata based on field specific attributes in the expanded dataset metadata to determine chunking parameters for chunking the set of data statements,
the select statement chunking rules denoting the performance estimates based on metrics derived from field specific performance, the select statements derived from the set of data statements,
the chunking parameters including a set of dimensions, a set of measures, a set of relationships, a set of hierarchies, a set of additivity characteristics, a set of cardinality characteristics and a set of structure characteristics;
generating a set of candidate chunking schemes from the chunking parameters;
accessing the performance data to generate performance estimates for the set of candidate chunking schemes;
selecting the chunking scheme from the set of candidate chunking schemes based on the performance estimates;
consulting the expanded dataset metadata to perform at least one of determining the at least one chunking scheme, or generating one or more data operations, based on consulting the expanded dataset metadata,
generating a set of data operations from the set of data statements, the set of data operations generated based at least in part on the chunking scheme and one or more dimensions associated with the subject dataset based on the expanded dataset metadata;
determining execution directives for the set of data operations, the execution directives indicating how to execute the set of data operations;
executing the set of data operations over the subject dataset to generate results; and
merging the results from the set of data operations into a result set.

* * * * *